Sept. 11, 1951 G. MURRAY 2,567,492
PLURAL FILM COLOR CAMERA, INCLUDING HINGED FILM GATE
Filed May 24, 1948 3 Sheets-Sheet 1

Inventor
Gilbert Murray
By
E. L. Wendroth
Attorney

Sept. 11, 1951 G. MURRAY 2,567,492
PLURAL FILM COLOR CAMERA, INCLUDING HINGED FILM GATE
Filed May 24, 1948 3 Sheets-Sheet 2
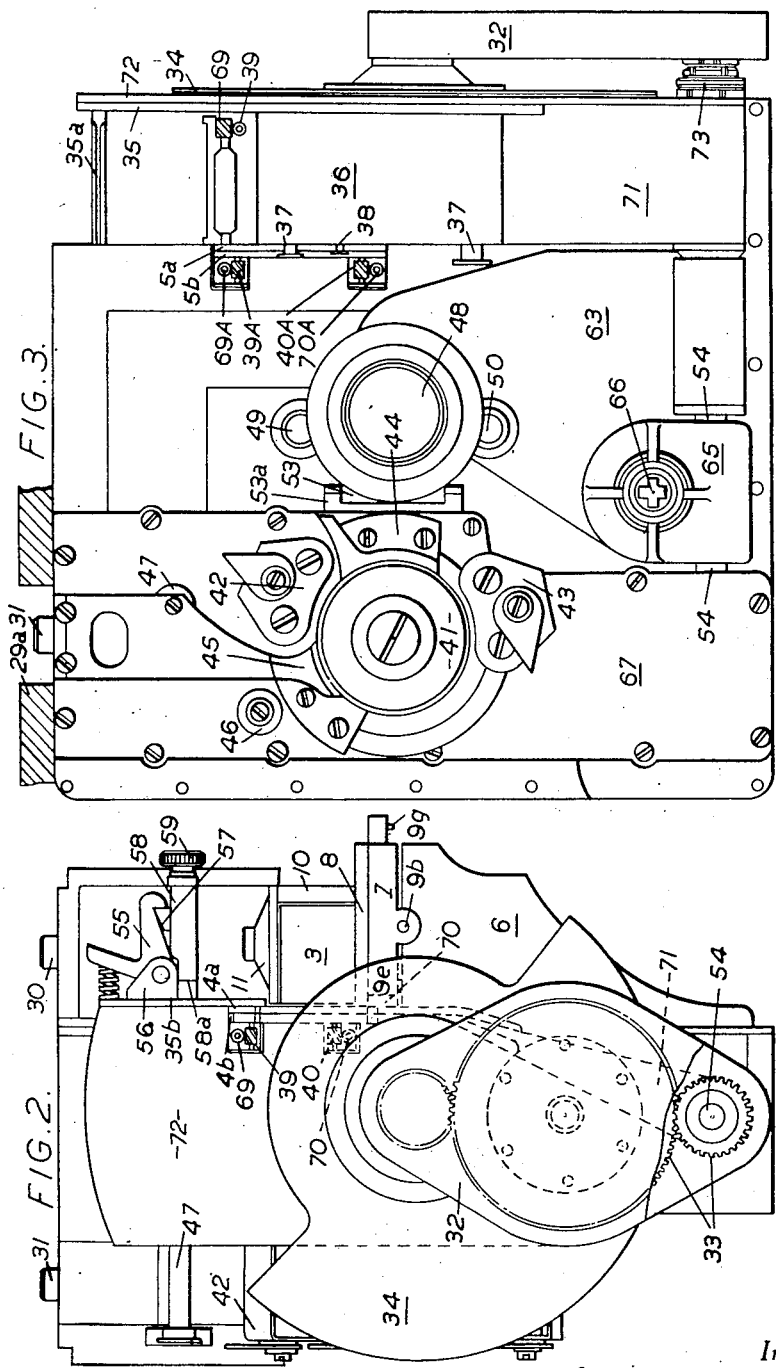
Inventor
Gilbert Murray
By
Attorney Sept. 11, 1951          G. MURRAY          2,567,492
PLURAL FILM COLOR CAMERA, INCLUDING HINGED FILM GATE
Filed May 24, 1948          3 Sheets-Sheet 3
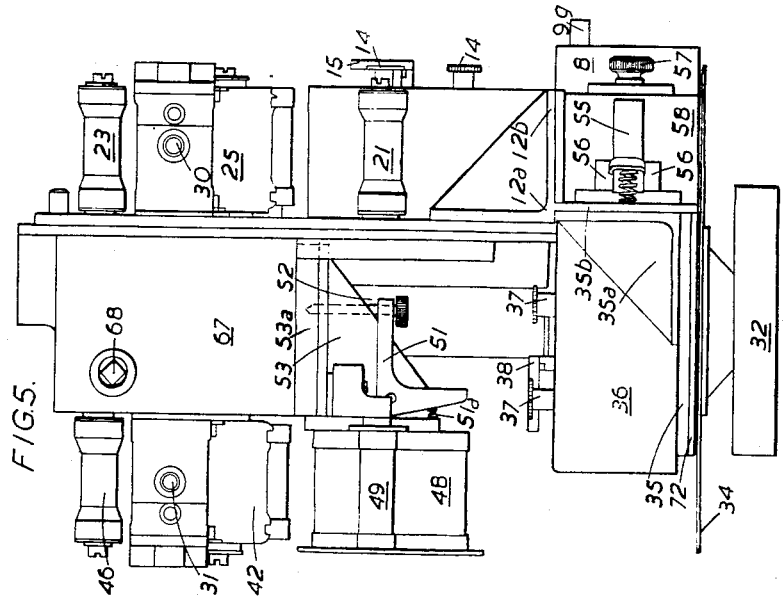
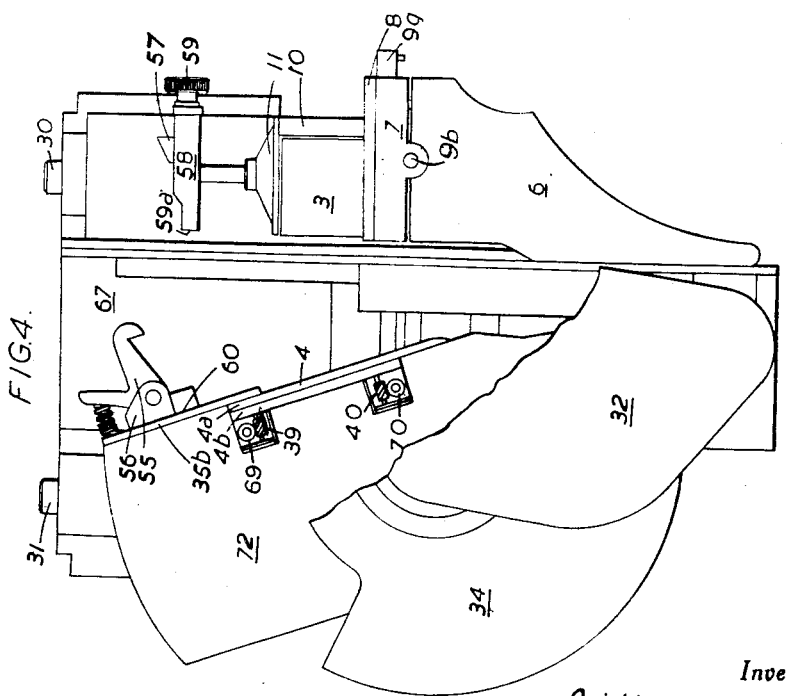
Inventor
Gilbert Murray
By
*Attorney*

Patented Sept. 11, 1951

2,567,492

UNITED STATES PATENT OFFICE 2,567,492

PLURAL FILM COLOR CAMERA, INCLUDING HINGED FILM GATE

Gilbert Murray, London, England, assignor to Dufay-Chromex Limited, London, England, a British company Application May 24, 1948, Serial No. 28,837
In Great Britain April 16, 1947

10 Claims. (Cl. 88—16.4)

1

This invention relates to cameras for taking photographs in colour of the kind in which a beam of light is passed through a light dividing system which reflects a part thereof whilst transmitting another part thereof.

The light dividing means is customarily placed at an angle of 45° to the axis of the incident beam of light and as a result the two exposure apertures are normally in planes substantially at right angles to each other. As a consequence the films employed are threaded into the exposure positions from different directions. In constructing such cameras the film transport mechanisms have been constructed as mirror images of each other and accordingly every pair has consisted of one standard and one non-standard mechanism. All such non-standard mechanisms have to be specially made and greatly increase the cost of manufacture of such cameras.

Ready access to the exposure positions and their associated guides is essential in cameras of this type and it has been the general practice to arrange for the front of the camera to be made removable in order to facilitate the loading of such cameras. In one type of camera a hinged front carrying the objective has been provided.

It is an object of the present invention to provide a camera in which the number of non-standard parts required is reduced to the minimum possible and specifically one in which the use of non-standard film transport means is avoided. A further object is to provide a camera in which a movably mounted front is not required.

The invention is conveniently utilized in the kind of colour camera which employs a prism block light dividing device by means of which reflected and transmitted beams of light are obtained which are substantially at right angles to each other. These beams are arranged to pass through apertures in apertured plates through which the film is exposed and each plate is associated with a film transport mechanism. These film transport mechanisms in accordance with a feature of the present invention are of like hand and they are preferably film transport mechanisms of standard type.

At least one of the apertured plates is hinged about one end thereof to facilitate the threading of the film. Unless this is done it is difficult to thread the camera in the confined space available. Preferably the apertured plate through which the reflected beam is passed is so mounted since this is the least readily accessible. The

2 most convenient arrangement has been found to be that in which the lower end of the plate is hinged so that the upper end may swing freely back for threading the film in. The upper end of the plate is provided with means for releasably locking it in the exposure position. Means which limits movement in two directions such as an accurately ground groove and tongue device has been found suitable for this purpose. The exact location of the swinging apertured plate in the taking position is a matter of importance.

Both film movement units are preferably driven off the same driving shaft and this may conveniently be the main shaft of the camera housed in the base of the camera body. The film movement which moves the film in the path of the transmitted light may be driven by a helical gear and a train of spur gears. The film movement which moves the film in the path of the reflected light may be driven by a chain of gear wheels which are mounted in such a way as to operate such movement and rotate the shutter of the camera at the same time: the apertured plate, with the associated film movement, and the shutter conveniently swing together. This apertured plate is conveniently mounted upon and swings about the axis of the main driving shaft and thus provides a compact unit.

The film magazines are conveniently mounted parallel to each other upon the top of the camera and slots are provided in the top of the camera through which the film passes. Since the film movement which moves the film in the path of the reflected beam is mounted in a direction substantially at right angles to the corresponding film magazine it has been found desirable to make suitable provision to guide this film on its path through the camera. For this purpose there is inserted in the path of the film between a sprocket guide past which the film passes on entering and leaving the camera, and its passage between the apertured plate and the film moving mechanism a guide roller assembly. A separate assembly may be inserted at a suitable point along the intended path of the film both before and after exposure or a guide roller with associated trapping rollers disposed substantially on opposite sides thereof may be used to guide the film in both directions. Such a trapping roller assembly is provided with the necessary removable parts to enable the camera to be readily threaded.

The invention will now be described with reference to the accompanying drawings in which:

Figure 2 is a front elevation inside the front of the camera.

Figure 3 is a side elevation from inside the other side wall of the camera showing the mechanism located upon the other side of the main panel.

Figure 4 is similar to Figure 2 but showing part of the shutter and drive mechanism cut away with the swinging movement in the open position.

Figure 5 is a plan view looking downwards inside the case of the camera.

Figure 1:
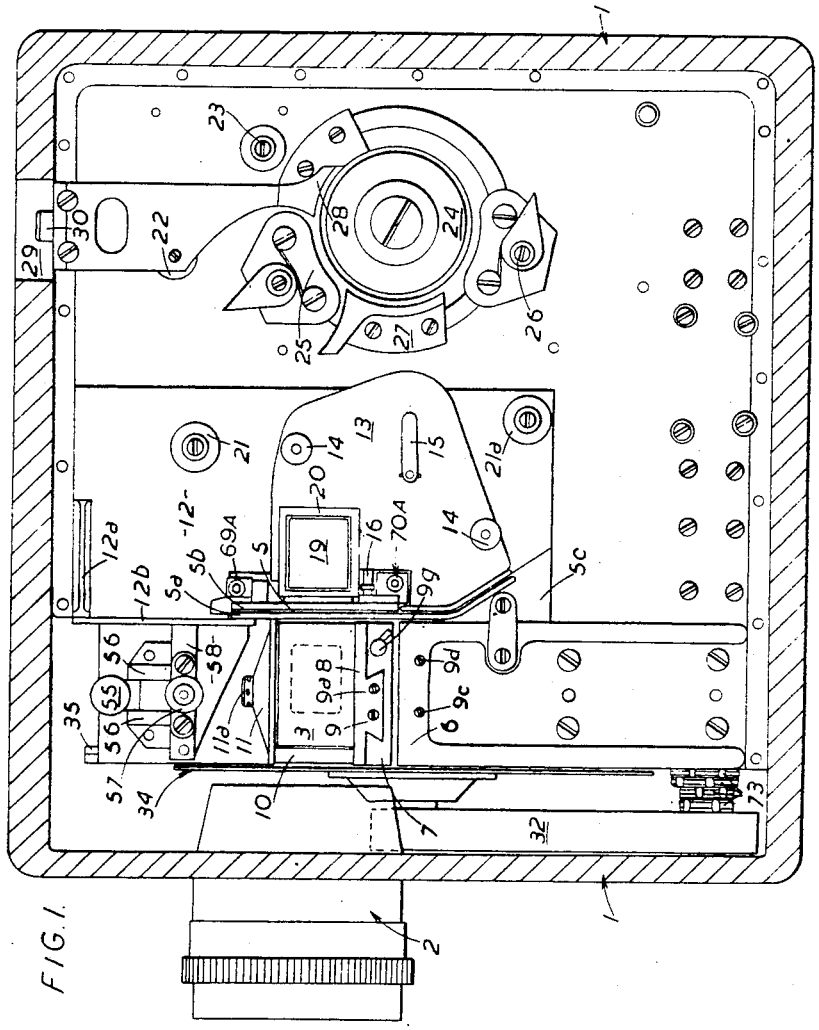
Figure 1 is a side elevation from inside one side wall of the camera showing the mechanism located upon one side of the main panel.

The camera mechanism is mounted upon the opposite sides of a main panel within casing 1 which, when the camera is in use is light-tight. Upon the front of the casing is mounted a lens mount 2. Behind the lens mount 2 and within the casing is mounted the light-dividing prism block 3 which divides the incident beam of light into two beams substantially at right angles. These beams of light pass respectively through the bipack gate 4 (Fig. 2) and the straight through gate 5.

The prism block 3 is mounted upon the dovetailed plate 8 which is slidably mounted upon adjustable platform 7 which is mounted upon the base 6. The adjusting and fixing means for the prism consists of a pair of screws 9, 9a mounted in the male dovetail in plate 8, the arrangement of which forms no part of the present invention.

The adjustable platform 7 carries upon its base a pair of arcuate lugs which co-operate with a corresponding central upstanding arcuate lug (not shown) upon table 6. A centrally located pin 9b passes through the three lugs permitting rotatable movement of the adjustable platform about the axis of the pin 9b. The table 6 carries two finely threaded screws 9c, 9d the adjustment of which is utilized to rotate the prism block about the axis of the pin 9b and to lock it in desired position. A locking member is provided for locking the plate 8 and platform 7 in the desired relative position. Such arrangement forms no part of the present invention.

The prism block 3 is held in position upon dovetail plate 8 by means of a pair of diagonally disposed posts 10 and clamping plate 11 which carries a clamping screw 11a.

The straight through film gate consists of front and rear elements 5a and 5b (Fig. 1) mounted upon a motion plate 12 which is itself mounted upon the main panel and carries the corresponding film moving and registration means under the cover 13, affixed to plate 12 by means of screws 14. On the outside of cover 13 is provided a lever 15 wherewith to withdraw the register pins 16 from gate 5 when film is being inserted.

The rear element 5b of gate 5 is removably mounted upon the first plate 5a by means of clamping nuts carrying worm wheels 39a and 40a operated by the worms 69a and 70a.

The front plate 5a is permanently mounted upon the motion panel 12 by means of the angle bracket 12a to which is fixed a downwardly extending portion 12b, the lower end of which carries the front plate 5a. The lower end of front plate 5a is supported upon the right angled block 5c which is screwed to the motion plate 12.

A prism 19 mounted behind the gate 5 in a holder 20 enables the operator to view the image through the film. For this purpose an inspection aperture (not shown) is provided in the casing.

A sprocket 24 is mounted upon the main panel of the camera rearwardly of the cover 13, and, above it, also mounted upon the panel are film guide rollers 22, 23. Two pairs of trapping rollers 25, 26 guide film past the sprocket 24. Film is prevented from wrapping about the sprocket 24 by means of the strippers 27, 28 also mounted upon the main panel. Film entering the camera from a magazine (not shown) through the aperture 29 passes upon the left side of roller 22 between trapping rollers 25 and sprocket 24 then outward between trapping rollers 25 and stripper 27 and thence upward and over the upper side of a further guide roller 21. It then passes downwardly between the front and rear elements 5a and 5b of the through film gate, thence past the underside of a guide roller 21a, between trapping rollers 26 and sprocket 24, upwardly past the left side of guide roller 23 and then out through aperture 29 to a magazine (not shown).

The second aperture plate is hingeably mounted upon and swings about the main shaft 54, Fig. 3, of the camera. By means of a train of gears, mounted within gear box 32 and partly shown at 33 (Fig. 2) the cut off shutter 34 which is mounted upon motion plate 35, is driven. These gears also serve to operate the mechanism of the bipack gate 4. The bipack gate 4, which is mounted upon motion plate 35, is of similar hand to the straight through gate 5. The motion plate 35 extends downwardly and is itself mounted upon a lug 71 which is carried upon the main shaft housing in the base of the camera (as will be apparent from Fig. 2). The block and bush are maintained in the desired relative positions by means of restraining nuts 73. The film moving and registering means are enclosed within cover 36 which is fixed to plate 35 by means of screws 37. This is generally similar to the corresponding parts of the transport mechanism within the casing 13 and, correspondingly, includes a lever 38 for withdrawing the registration pins from the gate 4.

The film gate 4 is made of front and rear elements 4a, 4b, the latter being removably mounted by means of clamping nuts carrying worm wheels 39, 40 controlled by worms 69, 70. The front plate 4a is permanently mounted upon the motion plate 35 by means of the angle bracket 35a to which is fixed a downwardly extending portion 35b the lower end of which carries the front plate 4a. The lower end of front plate 4a is supported upon the upper end of a lug 71 which is itself the bearing upon which the whole of the bipack gate and associated mechanism swings. The motion plate 35 is secured to plate 72, which in turn, is secured near the foot to lug 71.

A sprocket 41 is mounted upon the opposite side of the main panel from sprocket 24 and the two sprockets are driven by a common shaft. The associated retaining rollers 42, 43 are similar to the retaining rollers 25, 26 and the stripping blocks 44, 45 are similar to stripping blocks 27, 28 but are of opposite hand.

Between the bipack gate 4 and the sprocket 41 is a removable guide roller 48 having associated trapping rollers 49, 50 which serve to prevent the film from flapping excessively on its path to and from the bipack gate.

The removable guide roller 48 is mounted upon a right angled bracket 53 which is removably mounted in slide 54 which is secured to the main gear box 67. The right angled bracket 53 (Fig. 5) is locked in position by pin 52. Pin 52 may be withdrawn by means of an extracting lever 51 but is normally urged into the locked position by means of a spring 51*a*. The trapping rollers 49, 50 are each mounted upon a lug, one arm of which is in contact with a wedge member mounted upon bracket 53 and are pivoted about pins upon each of which is mounted a coiled spring adapted to exert an opening action upon the rollers 49—50 as the guide roller 48 is withdrawn.

Film entering the camera from the magazine (not shown) through the aperture 29*a* (Fig. 3) passes over the right surface of roller 47, between trapping rollers 42 and sprocket 41, then outward between trapping rollers 42 and stripper 44. It then passes between guide roller 48 and trapping roller 49. At this stage the emulsion surface of the film is towards the guide roller 48. The film then undergoes a twist and a right angled turn on its way to the bipack gate 4 which it enters from above. After emerging from the bottom of the bipack gate 4 the film undergoes a further twist and a further right angled turn and then passes, with its emulsion surface uppermost, between the guide roller 48 and the trapping roller 50. Thence the film passes between sprocket 41 and trapping rollers 43 and upwardly between the stripper block 45 and guide roller 46 and finally out through aperture 29*a* into the magazine (not shown).

The bipack gate is accurately located in the closed position as follows. An upward extension of the front face of bipack gate 4*a* carries a tongue 60 (Fig. 4) which, in the closed position exactly fits into a corresponding groove in the face 58*a* of the right angled table 58 which is carried upon an upward extension of the front of the straight through gate 5*a*. The upward extension of the front face of the bipack gate also carries a spring loaded catch 55 (Fig. 2) mounted in lugs 56 secured to the extension of plate 4*a*. The table 58 carries a slidably mounted pawl 57 which cooperates with catch 55. A knurled knob 59 carried upon a screw extension of pawl 57 through table 58 enables the film gate to be locked in the closed position, merely by rotating the knob 59.

The drive to the straight through gate 5 is by means of a train of gears enclosed by the cover 63 (Fig. 3) from the main shaft 54.

The bearing housing 65 (Fig. 3) carries a cross shaft 66 one end of which engages with the main shaft 54 and the said train of gears while the other end may be engaged to a tachometer if desired.

The main shaft 54 is keyed at one end (not shown) to engage with drive means (not shown) which is attached to the rear of the camera. The main shaft also passes through the gear box 67 (Figs. 3 and 5) and drives a vertical shaft 68 the top end of which is squared to drive the film take-up means associated with the film magazines. Shaft 68 also carried a skew gear which engages with the common shaft drive of the sprockets 24 and 41. Whilst the through film gate 5 has been described as being a single film gate and the second gate 4 has been described as a bipack gate it should be understood that each gate can be used for the exposure of a single emulsion film using appropriately sensitized photographic materials or that the bipack material may be exposed through the straight through gate 5 and the single film through gate 4.

I claim:

1. A cinematographic colour camera of the kind having a light dividing system by means of which two substantially perpendicular beams of light are produced to form images in two film gates mounted substantially at right angles to each other in which at least one film gate is hingeably mounted, about one end thereof, upon, and is adapted to swing about, the axis of a driving shaft mounted within the camera, said film gate being provided with latching and locking means for releasably locking it accurately located with respect to the light dividing system.

2. A cinematographic colour camera of the kind having a light dividing system by means of which two substantially perpendicular beams of light are produced to form images in two film gates mounted substantially at right angles to each other in which at least one film gate is hingeably mounted, about one end thereof, upon, and is adapted to swing about, the axis of a driving shaft mounted within the camera, said film gate being provided with latching and locking means for releasably locking it accurately located with respect to the light dividing system and in which a guide roller assembly is provided for guiding film before and after exposure in the hinged gate, said assembly being removably mounted in the camera to facilitate the threading of film to the hingeably mounted film gate.

3. A cinematographic camera comprising a light dividing system for producing two substantially perpendicular beams of light supported between two film gates mounted substantially at right angles to each other, one film gate hingeably mounted about one end thereof, upon, and adapted to swing about, the axis of a driving shaft mounted within the camera, intermittent film feeding mechanism mounted upon said hingeably mounted film gate and driven from said driving shaft and latching and locking means mounted upon said hingeably mounted film gate for releasably locking it accurately located with respect to the light dividing system.

4. A cinematographic camera according to claim 3 in which a cut-off shutter is provided which is also driven from said driving shaft.

5. A cinematographic camera comprising a light dividing system for producing two substantially perpendicular beams of light supported between two film gates mounted substantially at right angles to each other, one film gate hingeably mounted about one end thereof upon, and adapted to swing about, the axis of a driving shaft mounted within the camera, intermittent film feeding mechanisms of like hand mounted upon each of said gates, the feeding mechanism mounted upon the hingeably mounted gate being driven from said driving shaft, the driving means permitting partial rotation of the gate about the axis of the driving shaft, and latching and locking means mounted upon said hingeably mounted film gate for releasably locking it accurately located with respect to the light dividing system.

6. A cinematographic camera according to claim 5 in which a cut-off shutter is provided which is also driven from said driving shaft.

7. A cinematographic camera comprising a light dividing system for producing two substantialy perpendicular beams of light supported between two film gates mounted substantially at right angles to each other, one film gate hingeably mounted about one end thereof upon, and adapted to swing about the axis of a driving shaft mounted within the camera, intermittent film feeding mechanism mounted upon said hingeably mounted film gate and driven from said driving shaft, a guide roller assembly removably mounted within the camera for guiding film before and after exposure in said hingeably mounted film gate and latching and locking means mounted upon said hingeably mounted film gate for releasably locking it accurately located with respect to the light dividing system.

8. A cinematographic camera according to claim 7 in which a cut-off shutter is provided which is also driven from said driving shaft.

9. A cinematographic camera comprising a light dividing system for producing two substantially perpendicular beams of light supported between two film gates mounted substantially at right angles to each other, one film gate hingeably mounted about one end thereof, upon, and adapted to swing about, the axis of a driving shaft mounted within the camera, the axis of the hinge being substantially parallel to the axis of the camera objective, intermittent film feeding mechanism mounted upon said hingeably mounted film gate and driven from said driving shaft and latching and locking means mounted upon said hingeably mounted film gate for releasably locking it accurately located with respect to the light dividing system.

10. A cinematographic camera according to claim 9 in which a cut-off shutter is provided which is also driven from said driving shaft.

GILBERT MURRAY.

REFERENCES CITED

The following references are of record in the file of this patent:

UNITED STATES PATENTS

| Number | Name | Date |
|---|---|---|
| 1,363,822 | Stringham | Dec. 28, 1920 |
| 1,956,947 | Fairall | May 1, 1934 |
| 2,072,091 | Ball et al. | Mar. 2, 1937 |
| 2,089,106 | Beck | Aug. 3, 1937 |
| 2,379,690 | Cunningham | July 3, 1945 |

FOREIGN PATENTS

| Number | Country | Date |
|---|---|---|
| 12,469 | Great Britain | Of 1914 |